(12) United States Patent
Morelle et al.

(10) Patent No.: US 12,242,920 B1
(45) Date of Patent: Mar. 4, 2025

(54) QR CODE GENERATION ON TEST DEVICE

(71) Applicant: VeEX Inc., Fremont, CA (US)

(72) Inventors: Cyrille Morelle, Los Altos, CA (US); Ildefonso Miguel Polo, San Jose, CA (US); Cesar Kyle Della Casil, Santa Clara, CA (US); Monica Hua, San Jose, CA (US); Tri Khai Nguyen, San Jose, CA (US); Eugene Belianka, Fanipol (BY); Dmitriy Popesku, Minsk (BY)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 18/133,935

(22) Filed: Apr. 12, 2023

Related U.S. Application Data

(60) Provisional application No. 63/394,904, filed on Aug. 3, 2022.

(51) Int. Cl.
  *G06K 7/14* (2006.01)
  *G06F 16/955* (2019.01)
  *G06K 19/06* (2006.01)

(52) U.S. Cl.
  CPC ....... *G06K 7/1417* (2013.01); *G06F 16/9554* (2019.01); *G06K 19/06037* (2013.01)

(58) Field of Classification Search
  CPC ............ G06K 7/1417; G06K 19/06037; G06F 16/9554
  See application file for complete search history.

(56) References Cited

U.S. PATENT DOCUMENTS

| | | | |
|---|---|---|---|
| 8,856,211 B1 | 10/2014 | Kassamali et al. | |
| 8,936,194 B1 | 1/2015 | Welch et al. | |
| 9,173,092 B1 | 10/2015 | Hohpe | |
| 9,686,026 B1 * | 6/2017 | Reed | H04W 24/02 |
| 11,176,343 B2 | 11/2021 | Roux et al. | |
| 2016/0117581 A1 * | 4/2016 | Ortega | G06F 21/62 |
| | | | 235/494 |
| 2017/0237800 A1 | 8/2017 | Carruthers | |
| 2019/0042819 A1 * | 2/2019 | Agarwal | G05B 19/41835 |
| 2020/0110974 A1 * | 4/2020 | Norris | G06K 19/06037 |
| 2020/0351311 A1 * | 11/2020 | Mayet | G06K 7/1413 |
| 2021/0243185 A1 * | 8/2021 | Thasale | G06K 7/1413 |
| 2022/0174068 A1 | 6/2022 | Buida et al. | |

* cited by examiner

*Primary Examiner* — Laura A Gudorf
(74) *Attorney, Agent, or Firm* — Sheppard Mullin Richter & Hampton LLP

(57) ABSTRACT

Methods, systems, and non-transitory computer readable media are configured to perform operations comprising determining, by a device, one or more parameters and associated parameter values of a network operating condition; generating, by the device, a code based on the one or more parameters and associated parameter values; and providing, by the device, the code through an interface of the device, the code processable by a computing system.

20 Claims, 13 Drawing Sheets

1000

Determine one or more parameters and associated parameter values indicative of operating conditions of a communication network
1002

Generate a code based on the one or more parameters and associated parameter values
1004

Provide the code through an interface of the device, the code scannable by a computing system to access a server system controlled by an entity without software of the entity on the computing system
1006

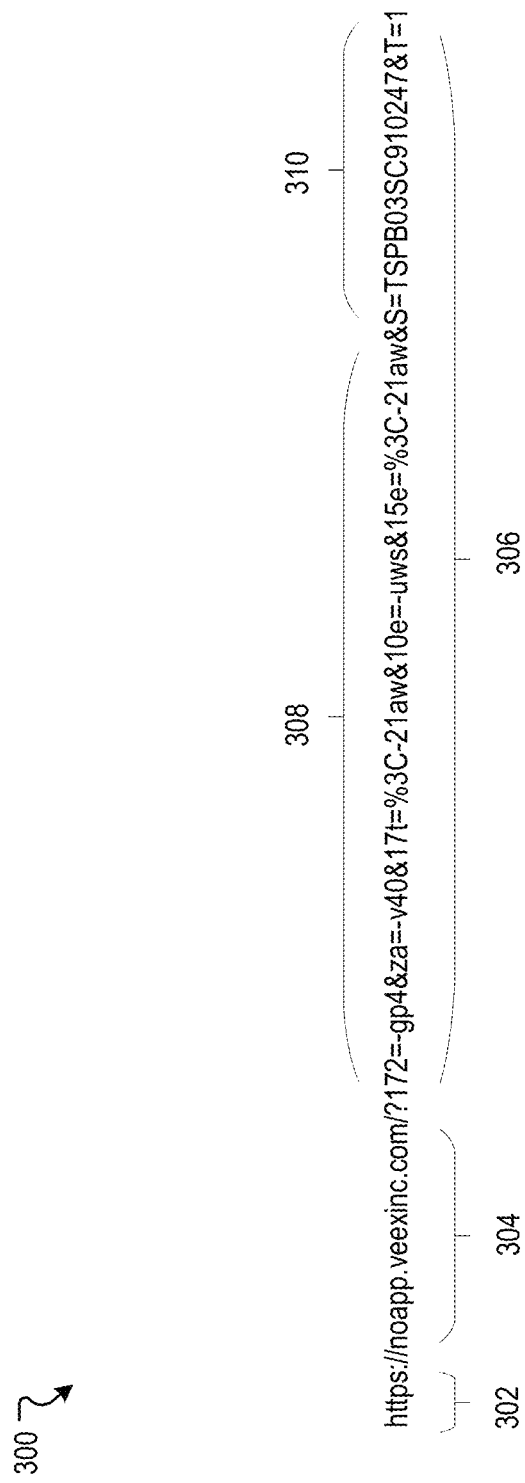

900

Tuesday, June 16, 2022 at 2:25:18 PM
GMT- 07:00

Latitude: 38.8011967
Longitude: -77.0638072

To: JohnDoe@email.com

Subject: TSPB3SC910247 | XGPON BRT RESULTS

Body:
    1270 nm:  -2.4dBm
    1310 nm:  1.7dBm
    1490 nm:  -9.8dBm
    1550 nm:  -3.4dBm
    1577 nm:  -6.4dBm

Tech Name: John Doe

Tech ID: 123

Job ID: 456

Comments: This was an important test

Determine one or more parameters and associated parameter values indicative of operating conditions of a communication network
1002

Generate a code based on the one or more parameters and associated parameter values
1004

Provide the code through an interface of the device, the code scannable by a computing system to access a server system controlled by an entity without software of the entity on the computing system
1006

Obtain encoded data in a URL contained in a code associated with a test performed on a communications network
1102

Decode the encoded data to determine at least one of measurement data or contextual data associated with the test
1104

Provide the at least one of measurement data or contextual data on a page for presentation on a computing device
1106

FIGURE 11

QR CODE GENERATION ON TEST DEVICE

CROSS-REFERENCE TO RELATED APPLICATIONS

This application claims priority to U.S. Provisional Patent Application No. 63/394,904, filed on Aug. 3, 2022 and entitled "QR Code Generation on Test Device and QR Code Decoding and Analysis," which is incorporated herein by reference in its entirety.

FIELD OF THE INVENTION

The present technology relates to testing and measurement of communications networks and related equipment. More particularly, the present technology relates to access to and communication of measurement results.

BACKGROUND

Various types of communications networks are available to deliver a wide array of services. Communications networks can be supported by various technologies, including, for example, cable networks, fiber optic networks, Ethernet, Wi-Fi, DSL, etc. Communications networks warrant monitoring and testing to assess their operation and to allow troubleshooting when problems arise. Appropriately configured test devices can measure and evaluate different aspects of communications networks to determine their operating conditions and performance.

SUMMARY

Various embodiments of the present technology can include methods, systems, non-transitory computer readable media configured to perform operations comprising determining one or more parameters and associated parameter values indicative of operating conditions of a communication network; generating a code based on the one or more parameters and associated parameter values; and providing the code through an interface of the device, the code scannable by a computing system to access a server system controlled by an entity without software of the entity on the computing system.

In some embodiments, the device is a test device without communications capabilities associated with broadband, Wi-Fi, Bluetooth, and NFC.

In some embodiments, the entity manufactured the device.

In some embodiments, the computing system is controlled by a field technician that is operating the device.

In some embodiments, the code is a QR code associated with a URL that is based at least in part on i) a domain of the entity and ii) the one or more parameters and associated parameter values.

In some embodiments, the generating the code comprises encoding at least a portion of the one or more parameters and associated parameter values; generating one or more encoded parameters and associated parameter values based on the encoding; and including the one or more encoded parameters and associated parameters values in the URL.

In some embodiments, the one or more encoded parameters and associated parameters values in the URL are decodable by the server system.

In some embodiments, character length of the one or more encoded parameters and associated parameter values is less than character length of parameters and associated parameter values that correspond to the encoded parameters and associated parameter values.

In some embodiments, a page comprising i) the one or more parameters and associated parameter values and ii) a plurality of options to share information in the page is renderable on the computing system.

In some embodiments, the page is revisable to include additional information provided by a field technician.

Various embodiments of the present technology can include methods, systems, non-transitory computer readable media configured to perform operations comprising obtaining, by a server system, encoded data in a URL contained in a code associated with a test performed on a communications network; decoding, by the server system, the encoded data to determine at least one of measurement data or contextual data associated with the test; providing, by the server system, the at least one of measurement data or contextual data on a page for presentation on a computing device.

In some embodiments, the code is a QR code generated by a test device that performed the test.

In some embodiments, the computing device does not store software of an entity in control of the server system.

In some embodiments, the entity manufactured the test device.

In some embodiments, the computing device stores a QR code reader and a browser.

In some embodiments, the page is generated and revisable by a website associated with the server system.

In some embodiments, the URL includes abbreviated expressions of parameters and does not include full expressions of the parameters, the decoding comprising converting the abbreviated expressions of parameters into the full expressions of the parameters.

In some embodiments, the URL includes parameter values for a type of test and does not include parameters associated with the parameter values, the decoding comprising determining parameters associated with the parameter values based on the type of test.

In some embodiments, the operations further comprise providing a plurality of sharing options on the page; and communicating information on the page based on selection of a sharing option of the plurality of sharing options.

In some embodiments, the operations further comprise detecting an exception when the at least one of measurement data or contextual data extracted from the URL is inconsistent with information maintained in a data store associated with the server system.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 3 illustrates an example URL, according to various embodiments of the present technology.

FIG. 9 illustrates an example file, according to various embodiments of the present technology.

FIG. 10 illustrates an example method associated with a test device, according to various embodiments of the present technology.

FIG. 11 illustrates an example method associated with a server system, according to various embodiments of the present technology.

Figure 1:
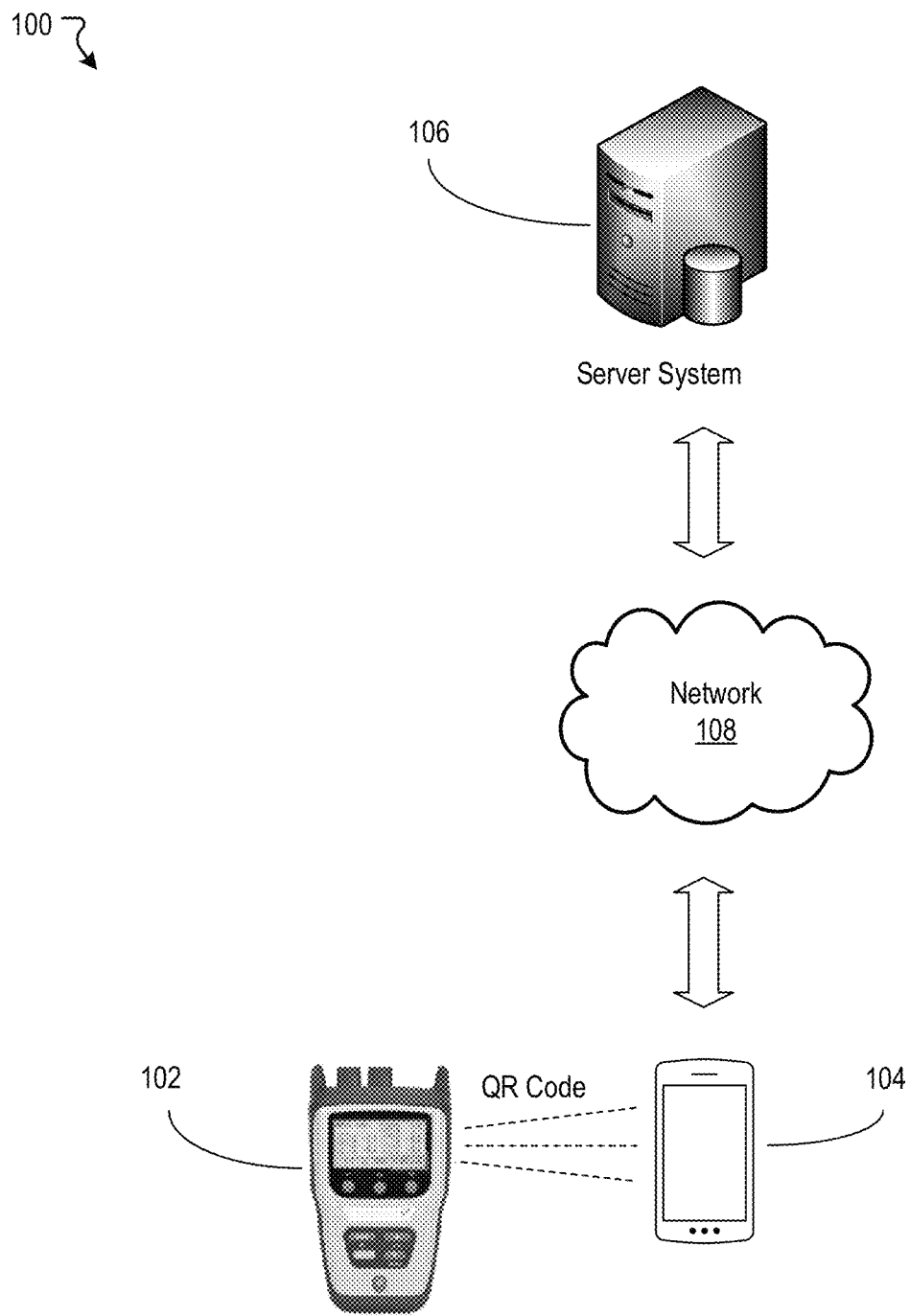
FIG. 1 illustrates an example system, according to various embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Various types of communications networks are available to deliver a wide array of services. Communications networks can be supported by various technologies, including, for example, cable networks, fiber optic networks, Ethernet, Wi-Fi, DSL, etc. Communications networks warrant monitoring and testing to assess their operation and to allow troubleshooting when problems arise. Appropriately configured test devices can measure and evaluate different aspects of communications networks to determine their operating conditions and performance.

Conventional test devices (or measurement devices) can be used by field technicians to measure and monitor various characteristics of a communications network. Such conventional test devices can provide different functionality relating to, for example, spectrum analysis, power measurement, loss testing, fault location, signal multiplexing, light generation, etc. After utilizing a conventional test device to obtain a measurement about some aspect of a communication network, measurement data associated with the measurement may be reported to or shared with others to provide an indication about the operating condition of the communication network. For example, a field technician may be assigned to perform a repair on the communication network. In this example, the field technician can report the measurement data to a service provider in control of the communications network to demonstrate successful repair and proper operation of the communications network.

Reporting of measurement data can be problematic in many respects. For example, a field technician may need to read measurement data from the conventional test device and manually transcribe the measurement data in a separate record before providing the record to others. Such a technique can be cumbersome and inefficient, especially when the amount of measurement data is large. Further, because of the compact form factor of many test devices, display of measurement data can be difficult for a field technician to read. Accordingly, the measurement data can be incorrectly read from conventional test devices and incorrect measurement data can be communicated to others. Even when measurement data is correctly read from a conventional test device, the measurement data can be incorrectly transcribed or recorded through inadvertence by a field technician. Or, in some situations, measurement data determined by a conventional test device can be deliberately altered. In both cases, inaccurate measurement data is undesirably provided to others.

An improved approach rooted in computer technology overcomes the foregoing and other disadvantages associated with conventional approaches specifically arising in the realm of computer technology. Based on computer technology, the present technology provides a device, such as a test device (or measurement device), configured to generate a QR code based on measurement data and contextual information. The test device can obtain the measurement data through measurement during a test. The measurement data can reflect various parameters and associated parameter values reflective of operating conditions of the communications network or related equipment. The contextual information can be information associated with the test device or the test. The test device can encode a least a portion of the measurement data and the contextual data to generate encoded data. A URL including a domain (and subdomain) associated with a server system of an entity and the encoded data can be generated. In response to a command by a field technician operating the test device, a QR code can be generated based on the URL. The QR code can be displayed through an interface of the test device.

A computing device associated with the field technician, such as a smartphone, can scan the QR code displayed on the test device to access a website maintained by the server system of the entity. The server system can receive and decode the encoded data to recover the measurement data and the contextual data. The server system can provide, for example, the measurement data and the contextual data on a page for display on the computing device. The page can be rendered through a conventional browser running on the computing device. After display of the page on the computing device, the field technician can add additional data to the page. Based on a menu of options to share the page, the field technician can select an option to communicate information on the page to others through a variety of sharing techniques. The present technology does not require or utilize software (e.g., an application) created by the entity to be installed or otherwise stored on the computing device.

The present technology thus poses myriad advantages over conventional techniques. For example, the present technology automates and thus simplifies the sharing of detailed measurement data and contextual data associated with a test performed by a test device. Further, the use of a QR code in accordance with the present technology allows more detailed test result data, such as parameters and associated parameter values, to be conveyed in comparison to simplistic "pass" or "fail" indications displayed on conventional test devices. In addition, the present technology prevents the communication of inaccurate measurement data through manual error or intervention. Further, because no dedicated software is utilized on a computing device that reads a QR code, the significant expense and burden of deploying such software across computing devices of a large organization of field technicians is avoided. Another advantage of the present technology is that a readily available computing device, such as a smartphone, is leveraged to communicate measurement data and contextual data determined by a test device to others. Utilization of the computing device in this manner obviates the need to add extensive, expensive communication capabilities to the test device itself. These and other inventive features of the present technology are discussed in more detail below.

FIG. 1 illustrates an example system 100, according to various embodiments of the present technology. The system 100 can include a test device 102, a computing device 104, and a server system 106. The test device 102 can be any suitable test device or measurement device. The test device 102 can be coupled to a communications network or equipment to measure various characteristics, or parameters, of the communications network. The parameters and associated parameter values that are measured by the test device 102 can reflect operating conditions of the communications network. The test device 102 can be utilized by field technicians in all stages of network deployment, maintenance, field servicing, and service verification across various types of communication networks, such as Fiber Optics, CATV/DOCSIS, Mobile, Next-Generation Transport Network, Fibre Channel, IPTV, Wi-Fi, and various Ethernet technologies. In some embodiments, the test device 102 does not have capabilities to communicate with other computing systems or devices (e.g., test devices). For example, the test device 102 can be unable to communicate wirelessly with other computing devices or devices. As another example, the test device 102 can be unable to communicate (e.g., exchange data) with other computing systems or devices using broadband, Wi-Fi, Bluetooth, NFC, or other communication protocols or technologies. In some embodiments, the test device 102 can communicate with other computing systems or devices using broadband, Wi-Fi, Bluetooth, NFC, or other communication protocols or technologies. As discussed in more detail herein, the test device 102 can generate and display a code, such as a QR code, associated with a URL. The URL can include encoded data associated with measurement data resulting from a test of a communications network performed by the test device 102, as well as contextual data associated with the test device 102 or the test. In some instances, to enhance security, encoded data can be encrypted by any suitable encryption technique. The test device 102 can be manufactured or sold by an entity (e.g., company, corporation, organization, etc.). In some embodiments, the test device 102 can be a special purpose computing device configured to perform specific measurements or tests of a communications network. In some embodiments, the test device 102 can be a computing system as illustrated in FIG. 11.

The computing device 104 can be any computing device. For example, the computing device 104 can be a smartphone, a tablet, a smartwatch, or other type of mobile computing device. In some embodiments, the computing device 104 can include a QR code reader (or scanner) or a custom software application that has a custom built-in QR code reader (or scanner) capability. The QR code reader can provide functionality supported by any appropriately configured operating system or application running on the computing device 104. In addition, the computing device 104 can include a web browser (or browser). The browser can be supported or implemented by any appropriately configured operating system or application running on the computing device 104. In some embodiments, the computing device 104 does not include or have any software (e.g., an application) that was created or endorsed by the entity that manufactures or sells the test device 102. In some embodiments, the computing device 104 can be controlled by a field technician who is operating the test device 102. The computing device 104 can communicate with the server system 106 over a network 108, such as the Internet. In some embodiments, the computing device 104 can be manufactured and sold by an entity that is different from the entity that manufactures or sells the test device 102.

The computing device 104 can be positioned by a field technician so that the QR code reader of the computing device 104 can scan the QR code displayed by the test device 102. In some embodiments, the field technician can use a custom software application on the computing device 104 to scan and decode the associated URL to render a page without using a web browser or a server system. In some instances, if the code or associated URL has been encrypted, the custom software application can decrypt the code or associated URL. The page generated by the custom software application can include parameters and related parameter values measured by the test device 102. The parameters and related parameter values can be presented on the page generated by the customer software application in a variety of rich and dynamic presentation formats that are different from presentation on a page generated by a browser. In some embodiments, upon scanning of the QR code, a browser of the computing device 104 can be directed by the associated URL to a website run by the server system 106 and controlled by an entity. In some embodiments, the entity controlling the website can be the same entity that manufactured or sold the test device 102. In some embodiments, the entity controlling the website can be different from the entity that manufactured or sold the test device 102. The browser of the computing device 104 can render a page provided by the website. The page generated by the browser can include the parameters and related parameter values measured by the test device 102. For example, the parameters and related parameter values can be displayed as plain text. The page also can include fields that prompt the field technician to provide additional information. Upon provision of additional information through the page, the browser can render a revised page on the computing device 104 that includes the additional information. The page can include a plurality of selectable options to provide the information in the page to others through a variety of sharing techniques, as discussed in more detail herein.

The server system 106 can maintain and run a website addressed by the URL associated with the QR code. The server system 106 can decode the encoded data, such as the encoded parameters and parameter values, in the URL. In some instances, if the encoded data has been encrypted, the server system 106 can decrypt the encoded data. The server system 106 can include the decoded parameters and parameters values in a page that is renderable on the browser of the computing device 104. The server system 106 also can receive additional information from the computing device 104 to include in an updated or revised page that includes the parameters and associated parameter values as well as the additional information. The server system 106 can generate the page or the revised page to include a plurality of selectable sharing techniques. Selection of a particular sharing technique can allow a field technician to provide the information in the page in a desired manner as a report to others. In this way, the information, including the parameters and associated parameter values that are measured by the test device 102, can be faithfully and accurately shared with others without risks or problems posed by manual intervention. In some embodiments, the server system 106 can be operated or controlled by the same entity that manufactures or sells the test device 102. In some embodiments, the field technician operating the test device 102 can be employed by or affiliated with an entity that is different from the entity that operates or controls the server system 106. More details regarding the functionality of the test device 102, the computing device 104, and the server system 106 are provided herein.

Figure 2:
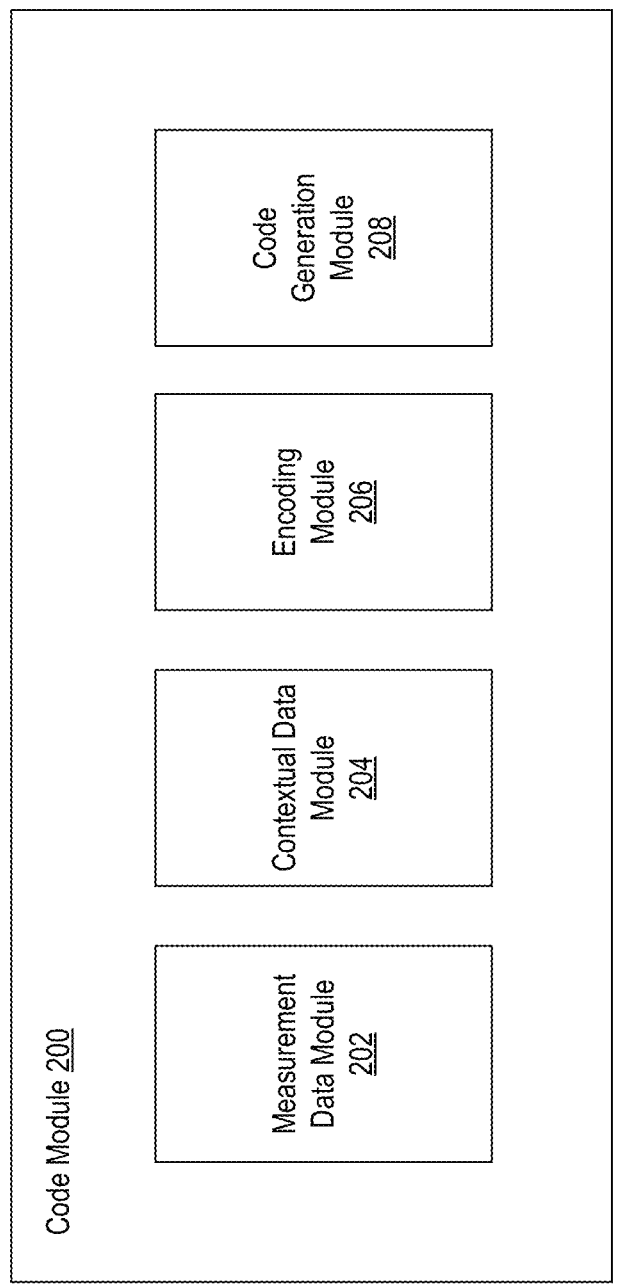
FIG. 2 illustrates an example code module associated with a test device, according to various embodiments of the present technology.

FIG. 2 illustrates an example code module 200, according to various embodiments of the present technology. The functionality of the code module 200 can be provided by instructions stored in a memory of the test device 102 that are executable by a processor of the test device 102. The code module 200 can include a measurement data module 202, a contextual data module 204, an encoding module 206, and a code generation module 208. The components (e.g., modules, elements, interfaces, blocks, functions, filters, switches, etc.) shown in this figure and all figures herein are exemplary only, and other implementations may include additional, fewer, integrated, or different components. Some components may not be shown so as not to obscure relevant details. Some components may be simplified so as to allow focus on relevant details.

The measurement data module 202 can receive, obtain, or determine measurement data associated with measurements taken by the test device 102. The measurement data can relate to any parameters (or keys) of a communications network or related equipment and their measured values that can reflect operating conditions of the communications network. The measurement data can allow a field technician in control of the test device 102 or others having access to the measurement data to assess performance of the communications network. As just some examples, the measurement data can be associated with observed or detected power levels (e.g., electrical, optical), frequencies, wavelengths, data speeds (upstream, downstream), lengths of cables (e.g., fiber cable), voltage levels, error rates, alarms, etc. The measurement data module 202 can acquire the measurement data to include in a URL that can be represented as a QR code.

The contextual data module 204 can obtain or determine contextual data apart from measurements taken by the test device 102. The contextual data can be associated with the test device 102 or a test performed by the test device 102. For example, the contextual data can include a type (or mode) of test performed by the test device 102 and an identifier (e.g., serial number) of the test device 102. In some embodiments, the contextual data can include a time stamp that describes a date and time (or time interval) when the measurements were taken by the test device 102.

The encoding module 206 can encode some or all of the measurement data, which includes parameters and associated parameter values, and the contextual data to generate encoded data. For example, the encoding module 206 can encode all of the measurement data and all of the contextual data, all of the measurement data and a portion of the contextual data, a portion of the measurement data and all of the contextual data, or a portion of the measurement data and a portion of the contextual data. The encoding module 206 can generate a URL that includes the encoded data. The URL can address a website run by the server system 106 that can parse and decode the encoded data to obtain the measurement data and the contextual data.

The encoding module 206 can generate the encoded data in various manners. In some embodiments, the encoding module 206 can generate the encoded data to have a reduced or smaller total character length (or text length). A reduced or smaller total character length of the encoded data that is included in a URL can optimize the design and function of a QR code that contains the URL. For example, the encoding module 206 can generate encoded data so that the total character length of the encoded data is less than the total character length of the measurement data and the contextual data prior to encoding.

In some embodiments, the encoding module 206 can abbreviate or omit some measurement data or contextual data in a URL such that the length (e.g., number of alphanumeric characters) of the URL can be advantageously shortened, as discussed in more detail in relation to the server system 106. When a data store accessible by the server system 106 contains information that would be otherwise included in a URL, that information can be abbreviated in or omitted from the URL. As just one example, assume that a test device 102 performed a test of a particular type. In this example, assume further that the particular type of test involves measurements of predetermined (or known) parameters (e.g., predetermined wavelengths, predetermined frequencies, predetermined time intervals, etc.). In this example, when the URL contains an identification of the particular type of test, the server system 106 can determine the particular type of test from the URL. Further, the server system 106 can access the data store and determine that the particular type of test is associated with the predetermined, known parameters. As a result, the encoding module 206 can generate the URL without specifying the predetermined, known parameters. In this example, the encoding module 206 thus can encode the parameter values in the URL without their corresponding parameters. Assume further in this example that parameters and parameter values associated with the particular type of test are conventionally set forth in a predetermined sequence. Accordingly, the encoding module 206 can include the encoded parameter values in the predetermined sequence in the URL without the need to also include the parameter associated with each parameter value. Upon receipt of the URL, the server system 106 can determine the parameter associated with each decoded parameter value based on the predetermined sequence.

Based on information already known by the server system 106, the encoding module 206 can perform many different optimizations to decrease the length of a URL associated with a test. As just one example, assume that a particular type of a test is associated with parameter values of a predetermined, known unit (e.g., dBm, GHz, nm, etc.). In this example, the encoding module 206 can include the encoded numerical parameter values without a unit because the server system 106 can know the predetermined, known unit to associate with the parameter values. As another example, the encoding module 206 can abbreviate an expression of a parameter when the server system 106 already knows that the abbreviation represents the parameter. For example, the encoding module 206 can abbreviate a full expression of a parameter associated with a measurement at 1270 nm (e.g., "1270 nm") to generate the abbreviation "28" (or some other string) and include the abbreviation in the URL instead of the full expression. As yet another example, the encoding module 206 can include a parameter and parameter value indicating a type of test that was performed instead of a full expression of the type of test. For example, the encoding module 206 can include in a URL a parameter (e.g., "M") and associated parameter value (e.g., "A") to identify the particular type of test (e.g., XGPON burst mode) or another parameter value (e.g., "E2") to identify another type of test. Many variations are possible.

The encoding module 206 can utilize various other techniques to generate encoded data. In some embodiments, the encoding module 206 can generate encoded data using a data compression technique applied to the measurement data and the contextual data. In some embodiments, the encoding module 206 can generate encoded data that is not human readable so that the underlying measurement data and the contextual data cannot be manually discerned or otherwise decoded. For example, the encoding module 206 can generate abbreviations of expressions of parameters or parameter values to include in a URL that cannot be readily deciphered to obtain the expressions. The foregoing are merely examples. Other variations can be implemented in other examples.

As just one illustration, the test device 102 can perform a test on a communications network. Assume in this illustration that the type of test involves measurement of power levels at five wavelengths in a XGPON (10 Gbit/s passive optical network) network. The test can be performed by a test device 102 associated with a unique identifier, such as a serial number (e.g., "TSPB03SC910247"). Assume further in this illustration that the five wavelengths at which power levels are measured are 1270 nm, 1310 nm, 1490 nm, 1550 nm, and 1577 nm, and that the measured power levels at these wavelengths are, respectively, −40.32 dBm, −40.06 dBm, <−95 dBm, −21.64 dBm, and <−95 dBm. In this illustration, the measurement data can include the wavelengths at which the power levels are measured as parameters, and the measured power level values as associated parameter values. The contextual data can include the type of test performed by the test device 102 and the serial number of the test device 102.

In this illustration, the encoding technique performed by the encoding module 206 can obtain the measurement data and the contextual data, and encode the data through various operations to generate encoded data. For example, the encoding technique can multiply parameter values by a selected number to remove decimal values in the parameter values. As another example, the encoding technique then can convert parameters and parameter values into an alphanumeric string and parse the string by a selected base number. As yet another example, the encoding technique then can convert special characters (e.g., "<", ">", "%", etc.) based on browser readable URL encoding. For example, "<" (is less than) can be converted to "%3C". In addition, the encoding technique can encode the type of test performed by the test device 102 as well as the serial number of the test device 102.

Further, in this illustration, the encoding module 206 can generate a URL based on the encoded data. The URL can address a website run by the server system 106. The URL can include a domain (and subdomain) associated with the website. The URL further can include the encoded data associated with the measurement data and the contextual data. FIG. 3 is an example URL 300 generated by the encoding module 206, according to various embodiments of the present technology. The URL 300 can include a scheme portion 302, a domain portion 304, and a data portion 306. In this example, the scheme portion 302 can specify HTTPS. The domain portion 304 can specify an example subdomain, second level domain, and a top level domain that address a website run by an entity that can provide (serve up) pages for the computing device 104. The data portion 306 can include an encoded data portion 308 and an encoded contextual data portion 310. The encoded data portion 308 can include encoded data representative of the parameters and associated parameter values resulting from a test performed by the test device 102. The encoded contextual data portion 310 can include the serial number (e.g., "TSPB03SC910247") of the test device 102 and an indication of the type of test (e.g., test type="1") performed by the test device 102. The contents and structure of the URL 300 are merely an example. In some embodiments, the encoding module 206 can perform other encoding techniques involving other encoding operations to generate other types of encoded data to be included in other URLs. In some embodiments, the measurement data and the contextual data can be encrypted and then included in a URL. Many variations are possible.

The code generation module 208 can create a code based on the URL generated by the encoding module 206. The code can be a QR code that contains encoded measurement data and contextual data. The QR code can be any suitable type of QR code that is readable by the computing device 104. In some embodiments, the code generation module 208 can generate a QR code in response to a command applied to the test device 102. For example, an input to generate a QR code can be provided by a field technician through depression of a physical button of the test device 102. As another example, the field technician can select an option presented through an interface of the test device 102. The selection can be made by a touch gesture applied by the field technician to an interface displayed through a touchscreen of the test device 102. In some embodiments, the code generation module 208 can automatically generate a QR code including encoded data associated with a test without an input, command, or selection to do so by the field technician. In some embodiments, the generated QR code can be displayed or otherwise accessible for a threshold duration of time after completion of a test resulting in measurement data contained in the QR code. In some embodiments, the code generation module 208 can generate a QR code including encoded data associated with a test without displaying or otherwise providing un-encoded measurement data associated with the test through the test device 102.

Figure 4A:
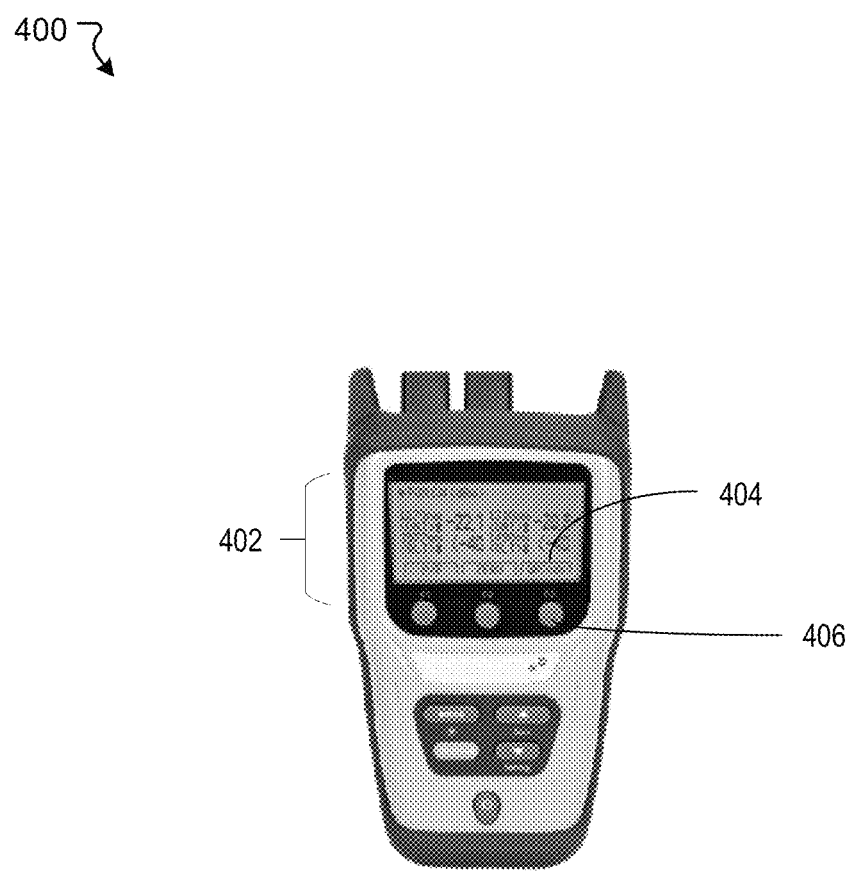
FIGS. 4A-4B illustrate an example test device, according to various embodiments of the present technology.
Figure 4B:

FIGS. 4A-4B illustrate an example test device 400 that is capable of generating a code, such as a QR code, according to various embodiments of the present technology. In some embodiments, the test device 400 can be the test device 102. In FIG. 4A, the test device 400 can include a display (or screen) 402 through which an operator of the test device 400, such as a field technician, can access information and interact with the test device 400 in relation to a test of a communications network. The display 402 can present various types of information, such as measurement data relating to a test. Displayed measurement data can include, for example, parameters and parameter values associated with the test. The display 402 can include an indication 404 of the ability of the test device 102 to generate a QR code containing a URL including encoded data associated with the test. The indication 404 can be associated with or adjacent to a button 406 of the test device 400. Upon depression of the button 406, the test device 400 can generate the QR code. In some embodiments, other mechanisms can be used to trigger generation of the QR code. For example, the display 402 can be a touchscreen through which an interface can be presented to the operator. The interface can include an icon or other reference indicating the ability to generate a QR code. Upon receipt of a gesture applied to the touchscreen selecting the reference, the test device 400 can cause the QR code to be generated. In some embodiments, a QR code can be automatically generated upon completion of a test. In FIG. 4B, a QR code 408 that is generated by the test device 400 is presented through the display 402. The QR code 408 as presented through the display includes encoded data associated with the measurement data and contextual data relating to the test.

Figure 5:
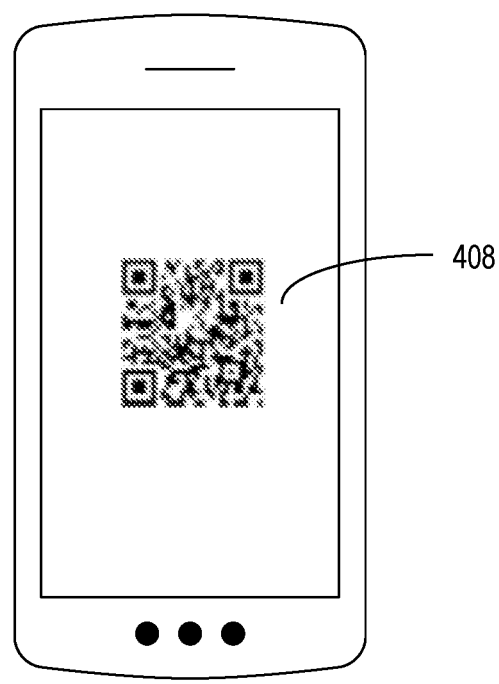
FIG. 5 illustrates an example computing device, according to various embodiments of the present technology.

FIG. 5 illustrates an example computing device 500 that is capable of reading a code, such as a QR code, according to various embodiments of the present technology. In some embodiments, the computing device 500 can be the computing device 104. The computing device 500 can be any computing device that is appropriately configured to scan a QR code. In some embodiments, the computing device 500 can have an operating system or an application that has functionality to scan a QR code. The computing device 500 can include a browser (or web browser). The browser can be any browser that is appropriately configured to render pages from a website addressed by the URL contained in the QR code. In some embodiments, the computing device 500 does not include, store, or execute any software (e.g., an application) that is generated, licensed, owned, maintained, or otherwise offered by the entity that manufactures or sells the test device 400. In some embodiments, the computing device 500 does not include, store, or execute any software (e.g., an application) that is generated, licensed, owned, maintained, or otherwise offered by the entity that controls or operates the server system 106. As shown, the computing device 500 has scanned the QR code 408 displayed by the test device 400. The scanning of the QR code 408 by the computing device 500 can obtain the URL contained in the QR code 408. Based on the URL, the browser on the computing device 500 can initiate communications over a network (e.g., Internet) between the device 500 and a website of the server system 106 addressed by the URL.

In some embodiments, the computing device 500 does not include, store, or execute software that has functionality to scan QR codes. For example, a QR code reader can be provided from the website of the server system 106 to the computing device 500 through the browser running on the computing device 500. In this example, the QR code reader provided by the website and running on the browser can scan a QR code presented by the test device 400. As another example, the computing device 500 can have a camera that can capture an image of a QR code presented by the test device 400. In this example, the image can be provided from the computing device 500 to the server system 106 and the server system 106 can scan the QR code from the image and obtain a URL contained in the QR code.

Figure 6:
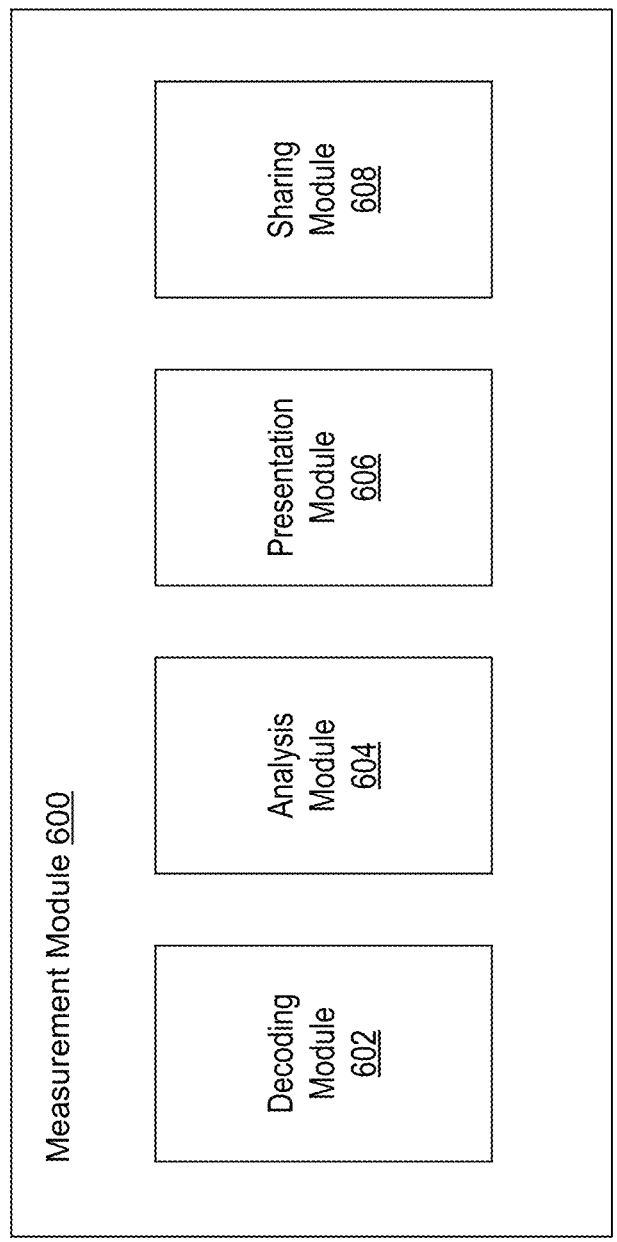
FIG. 6 illustrates an example measurement module associated with a server system, according to various embodiments of the present technology.

FIG. 6 illustrates an example measurement module 600, according to various embodiments of the present technology. The functionality of the measurement module 600 can be performed by a website and an associated server system, such as the server system 106. The website can be addressed by a URL contained in a QR code presented by the test device 102 (or test device 400) after a test. The measurement module 600 can include a decoding module 602, an analysis module 604, a presentation module 606, and a sharing module 608.

The decoding module 602 can parse a URL contained in a QR code and extract encoded data from the URL. The decoding module 602 can decode the encoded data in the URL. In some embodiments, the decoding module 602 can decode the encoded data by performing in "reverse" the sequence of operations used to generate the encoded data. As just one example, and further to the above illustration relating to the test involving measurement of power levels in a XGPON network by the test device 102, the decoding module 602 can decode the encoded data in the URL generated in response to the test. First, the "%3C" can be automatically converted to "<" by the browser. The decoding module 602 can parse the URL to obtain the encoded parameters and associated parameter values. The decoding module 602 then can apply the selected base number to the encoded data to obtain alphanumeric strings. The decoding module 602 then can convert the alphanumeric strings to values associated with the parameters and parameter values. The decoding module 602 then can divide the values associated with the parameters and the parameter values by the selected number to obtain the parameters and parameter values. The decoding module 602 then can parse the URL to obtain the serial number of the test device 102 and the type of test performed. The foregoing is merely an example decoding technique. The decoding module 602 can perform other types of decoding techniques based on the encoding technique selected to generate encoded data to be included in a URL. Many variations are possible.

The analysis module 604 can analyze the decoded measurement data and contextual data. In some embodiments, the analysis module 604 can access a data store of the server system 106 that maintains information associated with a plurality of test devices. In some embodiments, the plurality of test devices can include some or all of the test devices 102 manufactured, sold, or otherwise offered by an entity, such as the entity that also controls or operates the server system 106. In some embodiments, the plurality of test devices can include some or all of the test devices 102 manufactured, sold, or otherwise offered by other entities that do not control or operate the server system 106. The plurality of test devices can be owned, deployed, or otherwise used by personnel associated with one or more organizations, such as network service providers or companies providing network testing services. An organization can employ, contract, or otherwise utilize field technicians to operate, maintain, or troubleshoot communications networks on which the plurality of test devices can perform testing.

The data store can maintain various types of information associated with the plurality of test devices. For example, the information can include an identifier (e.g., serial number) for each of the plurality of devices. The information can also indicate, for each test device, the type of the test device, such as whether the test device is a power meter, spectrum analyzer, sweep system, monitoring system, installation tester, fiber inspector, fault locator, channel checker, light source, etc. As another example, the information can associate each test device with one or more field technicians to whom the test device has been assigned. As still another example, the information can indicate skill levels of field technicians and indicate the types of test that a field technician is qualified to conduct. As yet another example, the information can indicate a schedule of tests that have been performed or will be performed by a particular test device. Further, the information can contain parameters and associated parameter values measured by tests performed by the plurality of test devices. The information also can indicate the date, time, and location associated with the performance of a test or the date, time, and location associated with scanning of a QR code associated with a test. In addition, the information can identify one or more field technicians who performed or are intended to perform each scheduled test. Further, the information can specify the type of test performed or to be performed for each scheduled test. In addition, the information can indicate the parameters tested or to be tested for each type of test. Further, the information can indicate a predetermined sequence of parameters to be tested or recorded for a particular test type. In addition, the information can include abbreviations or codes that represent full expressions of parameters or parameter values. As yet another example, the information can indicate an operating status of a test device, such as whether the test device is in service, in a warehouse, or in repair. Many different types of information associated with the plurality of test devices other than those expressly described can be maintained in the data store.

In some embodiments, the data store can store the information associated with the plurality of test devices as look up tables. The data store can be populated with information as the information becomes known to the server system 106. In some embodiments, the information associated with the plurality of test devices can be based on information provided by one or more organizations that own, control, or otherwise utilize the plurality of test devices. For example, the information provided by the organizations can be periodically or continuously received by the server system 106 (or entity that operates and controls the server system 106) through a suitably planned test device registration and update process in which the organizations participate.

Based on measurement data or contextual data determined from a URL, the analysis module 604 can look up or otherwise determine relevant data from the information associated with the plurality of test devices maintained in the data store. When relevant data is accessible from the data store and can be determined based on other data embedded in a URL, the URL need not be generated to include the relevant data. For example, based on an identifier (e.g., serial number) of a test device 102 that is included in a URL, the analysis module 604 can determine a date, time, and location of a test performed by the test device 102 from the information maintained in the data store. As another example, based on an identifier of a test device 102 that is included in a URL, the analysis module 604 can determine a type of test performed by the test device 102 from the information maintained in the data store. As still another example, based on a type of a test performed by a test device 102 and parameter values associated with the test that are included in a URL, the analysis module 604 can determine each parameter associated with each parameter value based on a predetermined sequence of the parameters from the information maintained in the data store. As yet another example, based on an identifier of a test device 102 included in a URL, the analysis module 604 can determine a field technician who performed a test from the information maintained in the data store. The foregoing are merely examples of relevant information that can be determined through access to or a search of the data store. The analysis module 604 can look up or otherwise determine any type of data relevant to a test device 102 or test performed by the test device 102 that is contained in the data store.

The analysis module 604 can perform validations and checks based on information maintained in the data store. In some embodiments, the analysis module 504 can detect anomalies or other exceptions in connection with the plurality of test devices. The analysis module 604 can identify an exception based on inconsistency between information in the data store and data extracted from a URL. For example, information in the data store can indicate that a particular field technician is assigned to perform a particular test at a particular test location. When data extracted from a URL indicates that a different field technician performed the particular test at the particular test location, the analysis module 604 can identify an exception. As another example, information in the data store can indicate that a particular field technician is qualified to perform permitted types of tests. When data extracted from a URL indicates that the field technician performed a test that was not of the permitted type, the analysis module 604 can identify an exception. Upon identification of an exception, the analysis module 604, for example, can request an explanation of the exception or provide a notification about the exception to appropriate personnel.

The presentation module 606 can automatically include various types of information on a page to be provided for the computing device 500 (or computing device 104). The page can be provided to the computing device 500 and rendered by a browser of the computing device 500. The presentation module 606 can generate the page to automatically include decoded measurement data and contextual data from a URL associated with a test performed by a test device 102 (or test device 400) on a communications network. The presentation module 606 can generate the page to also automatically include various types of information associated with the test device 102 that are maintained in the data store accessible by the analysis module 604. As discussed, the various types of information can include, for example, a date, time, and location of a test or scanning of a QR code; a type of a test; particular parameters evaluated during a test of a particular type; a field technician who performed a test; etc. In some embodiments, the presentation module 606 can generate the page to include relevant historical information based on the information maintained in the data store. For example, the historical information can include prior tests performed on the communications network and results (e.g., parameters and associated parameter values) of the prior tests.

The page can include an option for a field technician to manually provide additional information. For example, an icon can be selected through a touch gesture applied to a touchscreen on the computing device 500 through which the page appears. Upon selection of the icon, the presentation module 606 can generate an updated or revised page to prompt a field technician to provide additional data. For example, the page can provide various blank fields to prompt the field technician to provide an email address, a name, an identifier for the field technician, an identifier for a job during which a test was performed, any comments that the field technician may wish to provide about the job or the test, or other information. As another example, the page can provide an icon to allow the field technician to upload one or more files, such as images. The images can relate to aspects of a job or a test. In one instance, the images can capture a state of a communications network prior to a job during which a test is performed and a state of the communications network after completion of the job or the test. In another instance, the images can capture one or more screens of the test device 102 that display parameters and parameter values or other test results generated by the test device 102. As yet another example, the page can prompt provision of location information. For instance, a field technician can select an icon to cause the computing device 500 to determine location information (e.g., GPS information) of the computing device 500, which can be automatically loaded on the page. In some embodiments, the additional information can be provided as evidence to establish that the field technician has successfully completed a job or a test.

The presentation module 606 can generate the page to include a variety of sharing modes as options to communicate or share the information on the page. For example, the options can include an option to create a file (e.g., a .pdf file) of the information; an option to upload the information to cloud storage; an option to email the information; or, an option to send the information via text messaging. In some embodiments, other modes of sharing are possible.

The sharing module 608 can communicate or share the information provided on a page. The information can be communicated according to a selected sharing option. For example, if a field technician selects an option to create a .pdf file of the information, the sharing module 608 can cause a .pdf file including the information to be generated. As another example, if the field technician selects an option to upload the information to cloud storage, the sharing module 608 can provide the information to cloud storage within the server system 106 or elsewhere. For example, the cloud storage can be controlled or operated by an entity with which the field technician is affiliated or employed, or an entity operating the communications network on which the field technician performed a test. As yet another example, if the field technician selects an option to email the information or send the information via text messaging, the sharing module 608 can cause the information to be conveyed through, respectively, an email system or a text messaging system for receipt by desired recipients. In this example, the information can be embedded directly in an email or text message or included in a file attached to an email or text message.

Figure 7:
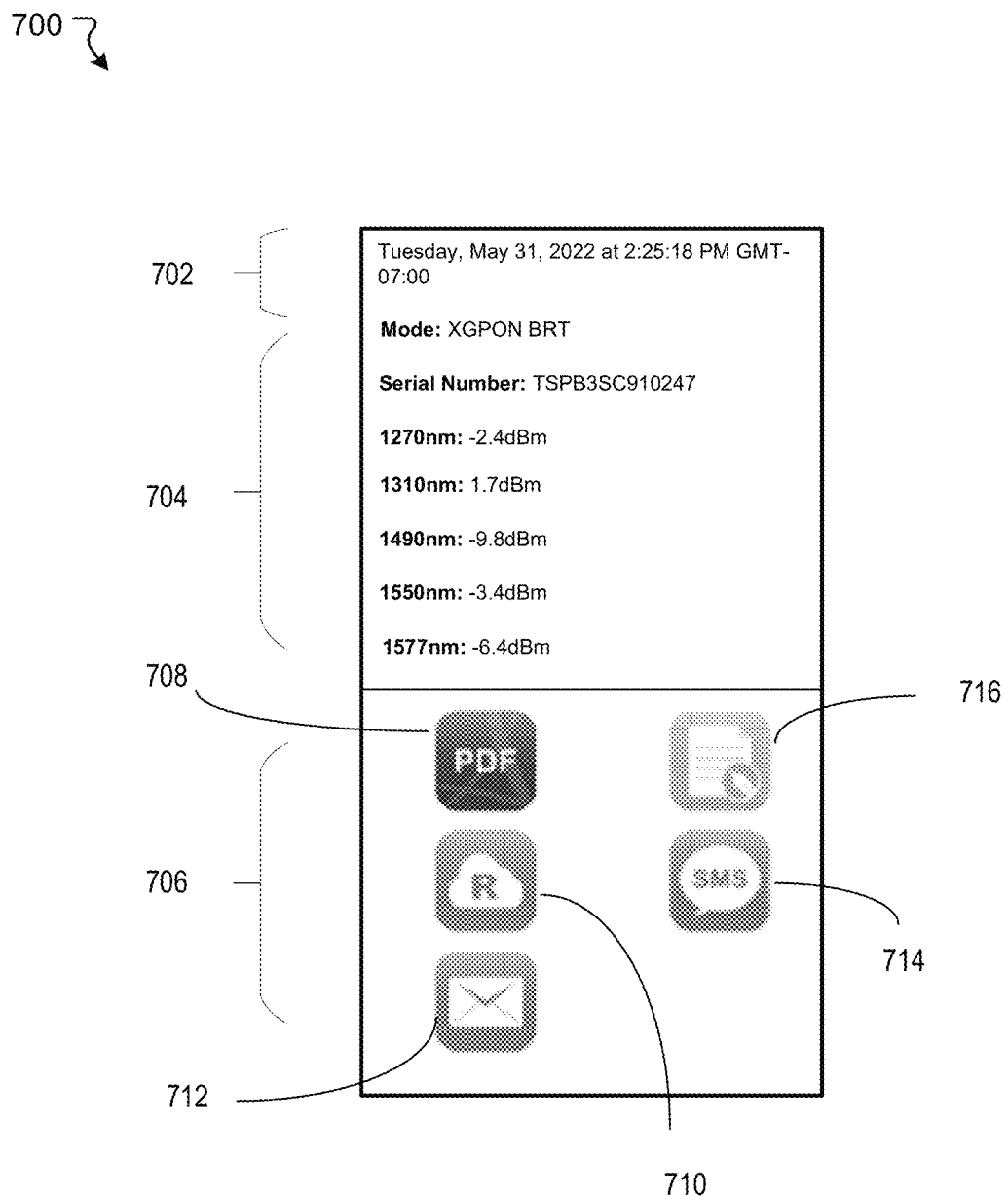
FIGS. 7-8 illustrate example pages, according to various embodiments of the present technology.
Figure 8:
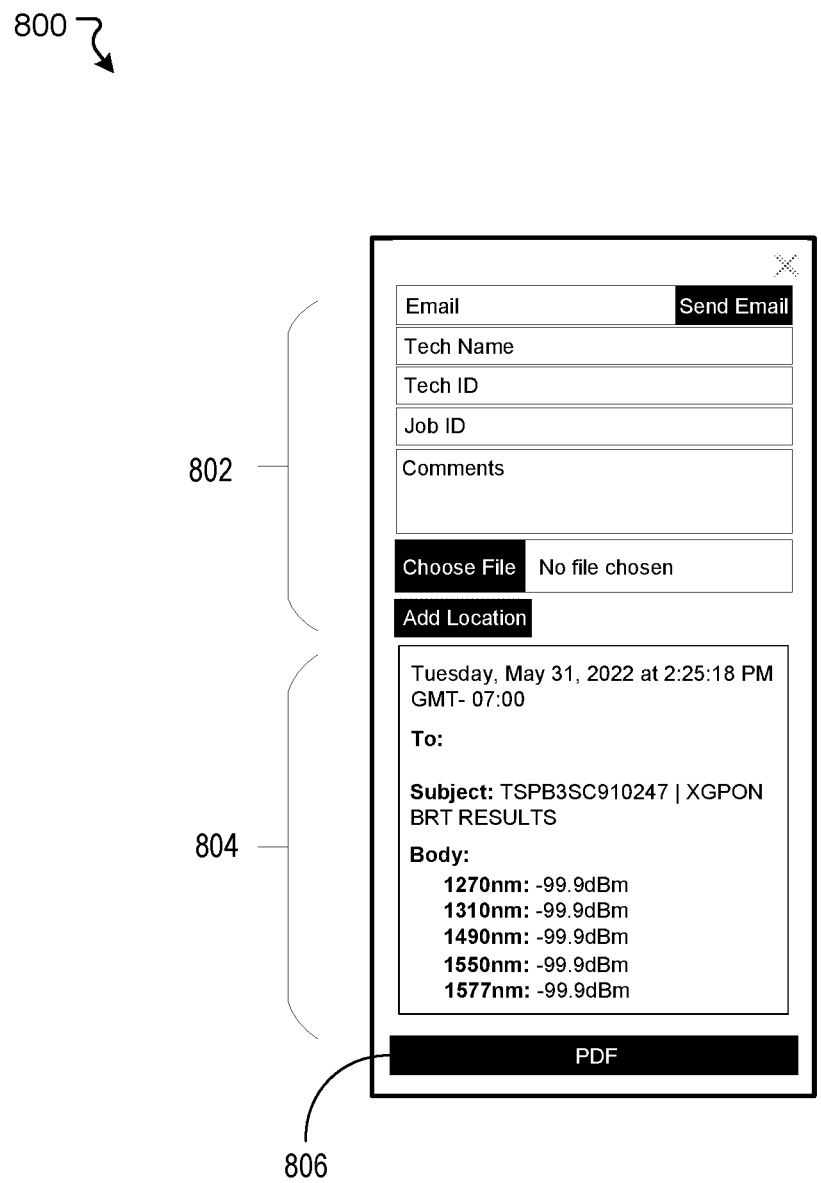

FIGS. 7-8 illustrate examples of pages generated by the measurement module 600, according to various embodiments of the present technology. In FIG. 7, an example page 700 is generated for rendering through a browser on the computing device 500 (or computing device 104). The page 700 can be displayed on the computing device 500 immediately after a QR code presented on the test device 102 is scanned by the computing device 500. The page 700 can contain various types of information. For example, as shown, the page 700 can include a section 702 including a time stamp. The time stamp can include the time and date when the computing device 500 scanned the QR code. In another example, the time stamp can indicate the time and date when the test device 102 performed a test that resulted in the QR code. The page 700 can include a section 704 that includes contextual data and measurement data. As shown, the contextual data includes a type (or "mode") of test that was performed and a serial number of the test device 102 that performed the test. The measurement data resulting from the test includes various wavelengths as parameters and measured power levels as parameter values. The page 700 can include a section 706 that includes sharing options. The sharing options can include an option 708 to create a file (e.g., a .pdf file) containing the information displayed on the page 700, an option 710 to upload the information to cloud storage, an option 712 to communicate the information via email, an option 714 to communicate the information via text messaging, and an option 716 to provide additional information on the page 700. In other examples, the page 700 can contain more types of information or fewer types of information than shown.

In FIG. 8, an example revised page 800 is generated in response to selection of the option 716 to provide additional information. The example page 800 includes a section 802 having fields through which additional information can be provided. As shown, the additional information to be provided can include an email address of a field technician, an identifier of the field technician, a job identifier associated with a job during which a test was performed, and comments from the field technician. The section 802 also can include options for the field technician to upload files (e.g., images) and to add location information regarding where the field technician is located or where the test was performed. In other examples, the page 800 can prompt provision of other types of information. The page 800 also can include a section 804 that includes information that previously appeared on the page 700.

The page 800 can include an option 806 to create a file of the information on the page 800. The option 806 can be selected by the field technician to create a .pdf file of the information on the page 800. The .pdf file can be generated to protect the information from alteration. FIG. 9 illustrates an example file 900 including various information provided on a page, according to various embodiments of the present technology. The file 900, such as a .pdf file, can be generated to include the information on the page 800. As shown, the file 900 includes a time stamp of the time and date when the QR code was read by the computing device 500 (or when the test associated with the QR code was performed), location data of the computing device 500, an email address of an intended recipient (e.g., the field technician who performed the test, operator of communications network on which the test was performed, etc.) of the information, a serial number of the test device 102, an identification of the type of test performed, measurement data determined from the test, the name of a field technician, an identifier of the field technician, a job identifier of a job associated with the test, and comments provided by the field technician. In other examples, the file 900 can include other types of information based on the selection of information that appears on the page 800.

FIG. 10 illustrates an example method 1000, according to various embodiments of the present technology. It should be appreciated that there can be additional, fewer, or alternative steps performed in similar or alternative orders, or in parallel, within the scope of the various embodiments discussed herein unless otherwise stated.

At block 1002, the method 1000 can determine one or more parameters and associated parameter values indicative of operating conditions of a communications network to determine a number of channels on an optical network. At block 1004, the method 1000 can generate a code based on the one or more parameters and associated parameter values. At block 1006, the method 1000 can provide the code through an interface of the device, the code scannable by a computing system to access a server system controlled by an entity without software of the entity on the computing system. It is contemplated that there can be many other uses, applications, and/or variations associated with the various embodiments of the present technology.

FIG. 11 illustrates an example method 1100, according to various embodiments of the present technology. It should be appreciated that there can be additional, fewer, or alternative steps performed in similar or alternative orders, or in parallel, within the scope of the various embodiments discussed herein unless otherwise stated.

At block 1102, the method 1100 can obtain encoded data in a URL contained in a code associated with a test performed on a communications network. At block 1104, the method 1100 can decode the encoded data to determine at least one of measurement data or contextual data associated with the test. At block 1106, the method 1100 can provide the at least one of measurement data or contextual data on a page for presentation on a computing device. It is contemplated that there can be many other uses, applications, and/or variations associated with the various embodiments of the present technology.

Figure 12:
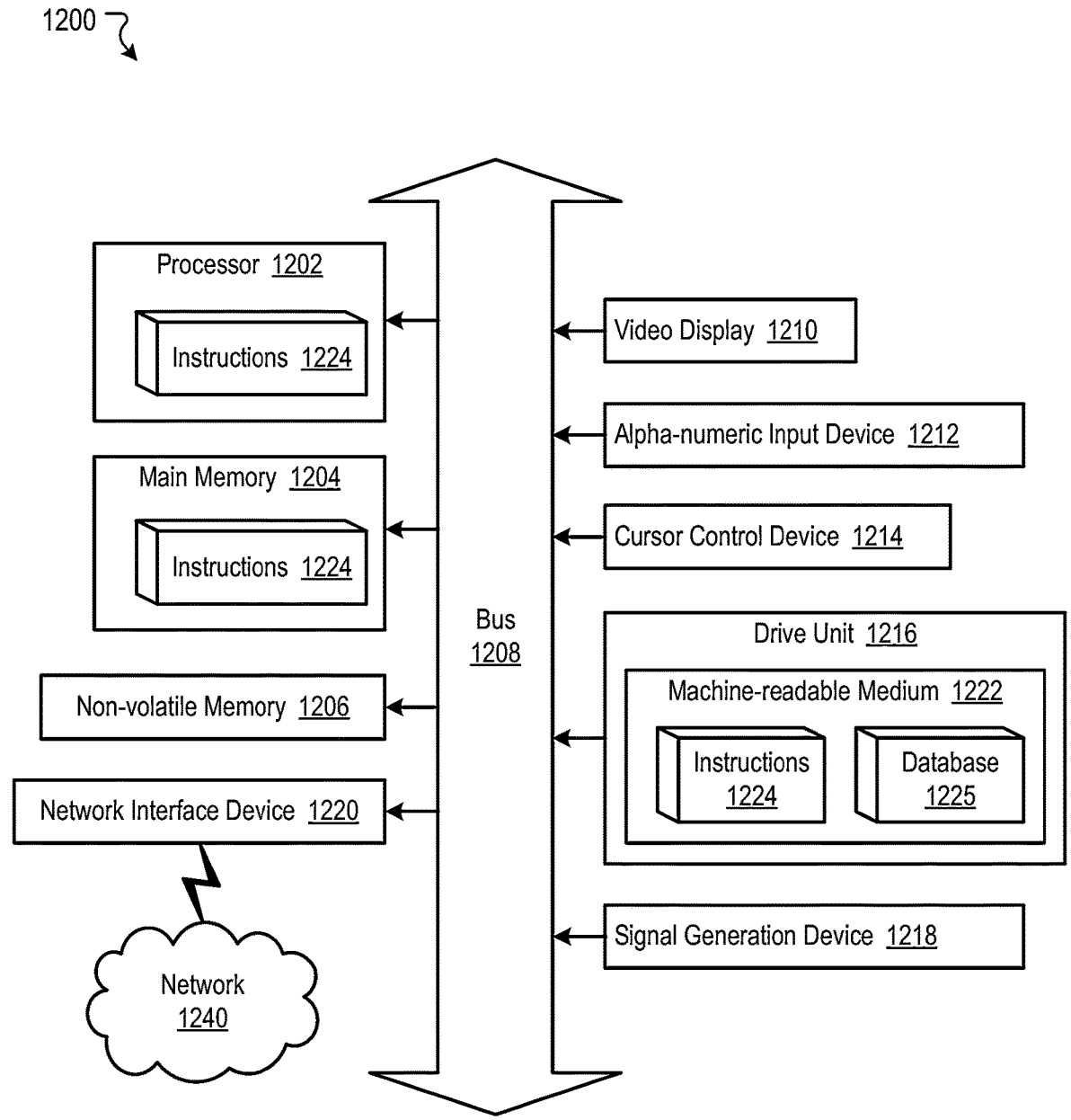
FIG. 12 illustrates an example of a computing system to implement one or more embodiments described herein, according to various embodiments of the present technology.

The foregoing processes and features can be implemented by a wide variety of machine and computing system architectures and in a wide variety of network and computing environments. FIG. 12 illustrates an example of a computing system (or computing device) 1200 that may be used to implement one or more of the embodiments described herein according to various embodiments of the present technology. The computing system 1200 includes sets of instructions 1224 for causing the computing system 1200 to perform the processes and features discussed herein. The computing system 1200 may be connected (e.g., networked) to other machines and/or computer systems. In a networked deployment, the computing system 1200 may operate in the capacity of a server or a client machine in a client-server network environment, or as a peer machine in a peer-to-peer (or distributed) network environment.

The computing system 1200 includes a processor 1202 (e.g., a central processing unit (CPU), a graphics processing unit (GPU), or both), a main memory 1204, and a nonvolatile memory 1206 (e.g., volatile RAM and non-volatile RAM, respectively), which communicate with each other via a bus 1208. In some embodiments, the computing system 1200 can be a desktop computer, a laptop computer, personal digital assistant (PDA), or mobile phone, for example. In one embodiment, the computing system 1200 also includes a video display 1210, an alphanumeric input device 1212 (e.g., a keyboard), a cursor control device 1214 (e.g., a mouse), a drive unit 1216, a signal generation device 1218 (e.g., a speaker) and a network interface device 1220.

In one embodiment, the video display 1210 includes a touch sensitive screen for user input. In one embodiment, the touch sensitive screen is used instead of a keyboard and mouse. The disk drive unit 1216 includes a machine-readable medium 1222 on which is stored one or more sets of instructions 1224 (e.g., software) embodying any one or more of the methodologies or functions described herein. The instructions 1224 can also reside, completely or at least partially, within the main memory 1204 and/or within the processor 1202 during execution thereof by the computing system 1200. The instructions 1224 can further be transmitted or received over a network 1240 via the network interface device 1220. In some embodiments, the machine-readable medium 1222 also includes a database 1225.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1206 may also be a random access memory. The non-volatile memory 1206 can be a local device coupled directly to the rest of the components in the computing system 1200. A non-volatile memory that is remote from the system, such as a network storage device coupled to any of the computer systems described herein through a network interface such as a modem or Ethernet interface, can also be used.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computing system 1200 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1200 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a device, one or more parameters and associated parameter values of a network operating condition and contextual data;
   generating, by the device, a code based at least on the one or more parameters and associated parameter values, wherein the code is a QR code and includes an address to a server system, the generating comprising:
      encoding the one or more parameters and associated parameter values, and
      generating one or more modified parameters and associated modified parameter values; and
   providing, by the device, the code through an interface of the device, the code processable by a computing system that is different from the device.

2. The computer-implemented method of claim 1, wherein the computing system is used to read the code to display, store, or transfer to another storage device or computing system content associated with the code.

3. The computer-implemented method of claim 1, wherein the computing system comprises a QR code reader to read the code, the QR code reader implemented by the computing system or a custom application running on the computing system.

4. The computer-implemented method of claim 1, wherein content associated with the code is displayable through a website in a first format or displayable through a custom application in a second format different from the first format.

5. The computer-implemented method of claim 1, wherein the code is encrypted.

6. The computer-implemented method of claim 1, wherein the code is decrypted and decoded by a server system or a custom application running on the computing system to determine the one or more parameters and associated parameter values.

7. The computer-implemented method of claim 1, wherein a custom application running on the computing system scans and decodes a URL associated with the code.

8. The computer-implemented method of claim 7, wherein the custom application renders a page including the one or more parameters and associated parameter values without a web browser or a server system.

9. The computer-implemented method of claim 1, wherein generating the code further comprises:
   including the one or more modified parameters and the associated modified parameter in the address.

10. The computer-implemented method of claim 9, wherein at least one type of information about a parameter or a parameter value is omitted from the address when the information is known by a data store accessible by a server in communication with the computing system.

11. The computer-implemented method of claim 9, wherein the server system decodes, translates, displays, stores, or transfers the one or more modified parameters and associated modified parameter values in the address.

12. The computer-implemented method of claim 11, wherein server system includes additional information.

13. A system comprising:
   at least one processor; and
   a memory storing instructions that, when executed by the at least one processor, cause the system to perform operations comprising:
   determining, by a device, one or more parameters and associated parameter values of a network operating condition and contextual data;
   generating, by the device, a code based at least on the one or more parameters and associated parameter values, wherein the code is a QR code and includes an address to a server system, the generating comprising:
      encoding the one or more parameters and associated parameter values, and
      generating one or more modified parameters and associated modified parameter values; and
   providing, by the device, the code through an interface of the device, the code processable by a computing system.

14. The system of claim 13, wherein the computing system is used to read the code to display, store, or transfer to another storage device or computing system content associated with the code.

15. The system of claim 13, wherein the computing system comprises a QR code reader to read the code, the QR code reader implemented by the computing system or a custom application running on the computing system.

16. The system of claim 13, wherein content associated with the code is displayable through a website in a first format or displayable through a custom application in a second format different from the first format.

17. A non-transitory computer-readable storage medium including instructions that, when executed by at least one processor of a server system, cause the server system to perform operations comprising:
   determining, by a device, one or more parameters and associated parameter values of a network operating condition and contextual data;
   generating, by the device, a code based at least on the one or more parameters and associated parameter values, wherein the code is a QR code and includes an address to a server system, the generating comprising:
      encoding the one or more parameters and associated parameter values, and
      generating one or more modified parameters and associated modified parameter values; and
   providing, by the device, the code through an interface of the device, the code processable by a computing system.

18. The non-transitory computer-readable storage medium of claim 17, wherein the computing system is used to read the code to display, store, or transfer to another storage device or computing system content associated with the code.

19. The non-transitory computer-readable storage medium of claim 17, wherein the computing system comprises a QR code reader to read the code, the QR code reader implemented by the computing system or a custom application running on the computing system.

20. The non-transitory computer-readable storage medium of claim 17, wherein content associated with the code is displayable through a website in a first format or displayable through a custom application in a second format different from the first format.

* * * * *